(12) United States Patent
Meggiolan (10) Patent No.: US 7,651,654 B2
(45) Date of Patent: *Jan. 26, 2010

(54) METHOD FOR PRODUCING A BICYCLE WHEEL RIM, APPARATUS FOR IMPLEMENTING THE METHOD AND BICYCLE WHEEL RIM OBTAINED THEREBY

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/739,814

(22) Filed: Apr. 25, 2007

(65) Prior Publication Data

US 2007/0187867 A1 Aug. 16, 2007

Related U.S. Application Data

(60) Division of application No. 10/815,585, filed on Apr. 1, 2004, now Pat. No. 7,258,402, which is a continuation-in-part of application No. 10/073,411, filed on Feb. 13, 2002, now Pat. No. 6,761,847.

(30) Foreign Application Priority Data

Feb. 13, 2001 (IT) .......................... TO2001A0121

(51) Int. Cl.
*B28B 7/32* (2006.01)
(52) U.S. Cl. .................. 264/315; 264/278; 264/314
(58) Field of Classification Search ................ 264/278, 264/315, 314, 257, 258
See application file for complete search history.

(56) References Cited

U.S. PATENT DOCUMENTS

| | | |
|---|---|---|
| 3,362,451 A | 1/1968 | McHugh |
| 4,030,754 A | 6/1977 | Merlette |
| 4,532,097 A | 7/1985 | Daniels et al. |
| 4,721,342 A | 1/1988 | Daniels et al. |
| 4,749,235 A | 6/1988 | McDougall |
| 4,930,843 A | 6/1990 | Lewis |
| 4,983,430 A | 1/1991 | Sargent |
| 5,184,874 A | 2/1993 | Olson et al. |
| 5,246,275 A | 9/1993 | Arredondo, Jr. |

(Continued)

FOREIGN PATENT DOCUMENTS

DE 3024934 1/1981

(Continued)

OTHER PUBLICATIONS

Kuchling, Horst, "the Little Book of Physics," Harri Deutsch Publishing, 1985, 507 Edition, pp. 592-593 (English Translation).

(Continued)

*Primary Examiner*—Christina Johnson
*Assistant Examiner*—Galen Hauth
(74) *Attorney, Agent, or Firm*—Volpe and Koenig, P.C.

(57) ABSTRACT

A bicycle wheel rim and a method of making a bicycle wheel rim are provided. The rim provided is made of a single part using structural fiber based material, preferably carbon fiber material, with two circumferential wings for anchoring the tire, which extend radially outwards from the two sides of the outer peripheral wall of the rim.

33 Claims, 10 Drawing Sheets

U.S. PATENT DOCUMENTS

| | | |
|---|---|---|
| 5,540,485 A | 7/1996 | Enders |
| 5,975,645 A | 11/1999 | Sargent |
| 6,036,279 A | 3/2000 | Campagnolo |
| 6,283,557 B1 | 9/2001 | Okajima et al. |
| 6,290,889 B1 * | 9/2001 | Castanie et al. ............. 264/219 |
| 6,347,839 B1 | 2/2002 | Lew et al. |
| 6,431,658 B1 | 8/2002 | Nakajima et al. |
| 2004/0066085 A1 * | 4/2004 | Schiers .................. 301/95.102 |

FOREIGN PATENT DOCUMENTS

| | | |
|---|---|---|
| DE | 4335062 | 4/1995 |
| DE | 4416796 | 11/1995 |
| DE | 4425592 | 1/1996 |
| EP | 0390300 | 10/1990 |
| FR | 2761300 A1 | 10/1998 |
| GB | 2051662 A | 1/1981 |
| JP | 58-132701 | 9/1983 |
| JP | 1-173001 | 12/1989 |
| JP | 06-008002 | 2/1994 |
| JP | 8132802 | 5/1996 |
| JP | 3053506 | 8/1998 |
| JP | 11-92849 | 4/1999 |
| WO | 98/57812 | 12/1998 |
| WO | 98154046 A2 | 12/1998 |

OTHER PUBLICATIONS

Wacker Silicone Article, "Elastosil RT 607," RTV0-2 Silicone Rubber, Nov. 1998 (English Translation).

* cited by examiner

Fig. 7

Fig_9

Fig_10

METHOD FOR PRODUCING A BICYCLE WHEEL RIM, APPARATUS FOR IMPLEMENTING THE METHOD AND BICYCLE WHEEL RIM OBTAINED THEREBY

CROSS REFERENCE TO RELATED APPLICATIONS

This application is a division of U.S. patent application Ser. No. 10/815,585, filed Apr. 1, 2004, which is a continuation-in-part of U.S. patent application Ser. No. 10/073,411, filed Feb. 13, 2002, which issued on Jul. 13, 2004 as U.S. Pat. No. 6,761,847, which are incorporated by reference as if fully set forth. This application also claims benefit of and priority to Italian Patent Application TO2001A000121, filed Feb. 13, 2001.

FIELD OF THE INVENTION

This invention relates to bicycle wheel rims of the type presenting a peripheral inner wall, a peripheral outer wall, two lateral walls joining said peripheral walls and two circumferential wings for anchoring a tire which radially extend outwards from the two sides of the outer peripheral wall. The invention also relates to a method for producing a rim of the type described above.

BACKGROUND

The Applicant has recently conducted various studies and tests to make bicycle wheel rims using structural fiber based material, typically carbon fiber based material. The advantage offered by this type of material is that of being light in weight with respect to the metallic materials used in the past given equal structural characteristics. Making a rim out of a single part of carbon fiber based material was difficult, at least utilizing the technologies available at that time, due to the typical conformation of the circumferential anchoring wings of the tire. Typically, these wings present peripheral outer edges folded one towards the other thus creating an undercut, which causes the molding problems.

SUMMARY

The invention relates to a rim for a bicycle wheel, comprising an inner peripheral wall, an outer peripheral wall, two lateral walls joining said peripheral walls, and two circumferential wings for anchoring a tire which radially extend outwards from the two sides of the outer peripheral wall, wherein said rim is made of a single part of structural fiber based material incorporating the two circumferential wings.

This invention also relates to a method for producing a bicycle wheel rim of the type presenting an inner peripheral wall, an outer peripheral wall, two lateral walls joining said peripheral walls, and two circumferential wings, for anchoring a tire, which extend outwards from the two sides of the outer peripheral wall, wherein it comprises the following steps:

applying on the inner part of a mold a predetermined number of layers of structural fiber fabric incorporated in a plastic material matrix which are to form the inner wall, the outer wall, the two lateral walls and the wings;

arranging an inflatable bag on the layers;

folding a first predetermined number of the layers on the inflatable bag;

applying at least one core over the folded first predetermined number of layers;

folding a second predetermined number of the layers over the core;

applying the outer part of the mold so as to enclose the layers;

inflating the inflatable bag so as to press the layers against the mold;

increasing the temperature of the mold to a value sufficient to cause reticulation of the plastic material matrix;

removing the bicycle wheel rim from the mold and removing the core and the inflatable bag so as to obtain a bicycle wheel rim formed of a single piece of structural fiber material.

The cores are made of a material with a thermal dilation coefficient exceeding $5 \times 10^{-5}$ mm/° C., the molding process comprising an increase in temperature to a value sufficient to cause the material of said cores to dilate so as to press the layers of fabric forming the tire anchoring wings against the wall of the mold.

Preferably, the material forming the cores has a thermal dilation coefficient exceeding $9 \times 10^{-5}$ mm/° C. and a maximum continuous thermal resistance temperature exceeding 100° C.

Again preferably, the material forming the core can be either PTFE (polytetrafluoroethene), or FEP (fluorinated ethene propene), or PCTFE (polychlorotrifluoroethene), or PVDF (polyfluorodivinylidene), or PE-HD (high density polyethylene).

The use of PTFE is widely preferred, due to the anti-adherence properties of this material, which are useful for detaching the core, or cores, from the structural fiber molded body, as well as its high continuous thermal resistance (260° C.), for its good thermal conductivity (0.25 W/m° C.) and for its good thermal capacity (specific heat), equal to 1.045 Kj/kg° C.

This material presents the characteristic of being subject to high thermal dilation at relatively low temperatures, in the order of temperatures at which the plastic material in which the structural fiber fabric is incorporated reticulates.

Structural fiber fabrics incorporated in a plastic material matrix are known and have been used for some time. They are made with yarn obtained from structural fibers, such as carbon fibers, for example. These fabrics are then subjected to an impregnation method to associate them with a plastic material matrix, typically a thermosetting plastic material.

According to an additional preferred embodiment of this invention, two ring-shaped cores of said thermally dilating material are used, each split into several sectors if required, which are arranged so as to be spaced from each other around the layers which are to form the peripheral external wall of the rim, each core supporting one of the two tire anchoring wings.

In a first embodiment, the space comprised between said two rings is filled by one wall of the mold. In a second form of embodiment, this space is filled by a third core, which is also a ring formed by several sectors, made of thermally dilating material. The cores being split into several sectors allows easy removal of said cores from the part obtained at the end of the molding process, after opening the mold, despite the undercut conformation of the two tire anchoring wings. In a third embodiment, the core is a silicone sheath made in a single continuous piece or in sectors centered by a projection of the outer mold.

As shown above, the application of the required pressure inside the mold on the layers destined to form the outer and inner peripheral walls of the rim, as well as the two lateral walls of the rim, is obtained by arranging an inflatable bag in the cavity between these layers. The bag is removed after molding through holes in the rim that are machined to provide access for spoke nipples. The bag can also remain inside the rim after the molding process. This technique was previously tested by the Applicant for making rims of the type above without tire anchoring wings. This technique cannot be used in a similar fashion for making said anchoring wings in rims of the type comprising said wings. For this reason, the Applicant has additionally developed studies to create this invention.

According to an additional preferred characteristic of this invention, the rim can initially be molded with anchoring wings which are longer than required. In this case, after the molding process, mechanical machining is carried out to reduce the wings to the required dimensions. This method also has the advantage of preventing superficial defects, which may be present on the circumferential edges of the two wings at the end of the molding process. This method is an invention in its own right, regardless of the type of molding process used.

The invention is also directed to the apparatus for carrying out the above described method as well as to the bicycle wheel rim per se. The features of the apparatus and the rim of the invention are also set forth in the appended claims.

BRIEF DESCRIPTION OF THE DRAWINGS

This invention will be better explained by the following detailed descriptions with reference to the accompanying figures as non-limiting examples, whereas.

DETAILED DESCRIPTION OF THE PREFERRED EMBODIMENTS

Figure 6:
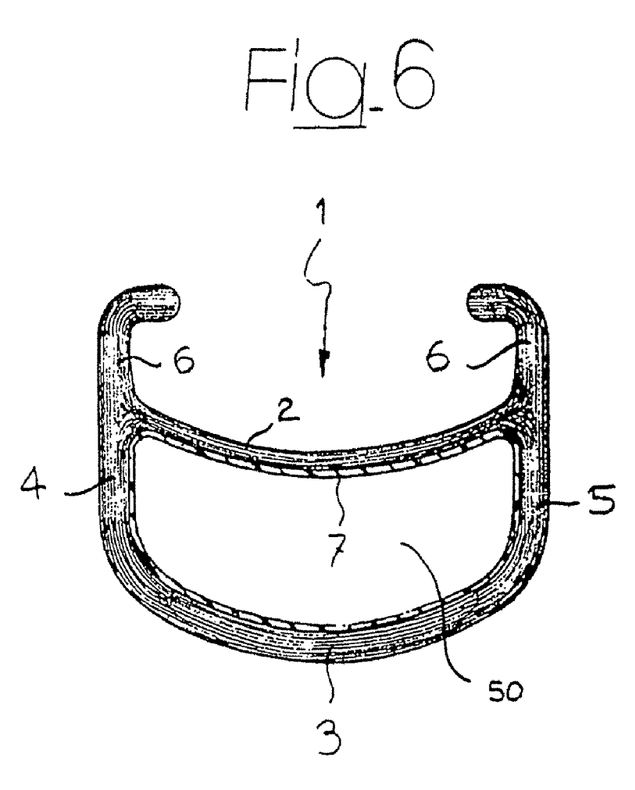
FIG. 6 illustrates the end product, which can be obtained either with the mold in FIGS. 1-3 or with the mold of FIGS. 4, 5, after final mechanical machining required to reduce the tire anchoring wings to the required dimensions.

With reference to FIG. 6, the method of this invention is used to make a rim 1 for a bicycle wheel, which cross section is shown in the figure. The rim comprises an outer peripheral wall 2, an inner peripheral wall 3, two lateral walls 4, 5, joining the peripheral walls 2, 3 and defining a closed circumferential cavity 50 with the peripheral walls 2, 3, and two circumferential wings 6 for anchoring a tire, which extend radially outwards towards the sides of the outer peripheral wall 2. As mentioned above, the rim 1 made with the method of this invention presents a body made of a single part made of structural fiber based material, preferably carbon fiber material. A plastic material bag 7 is arranged inside the cavity 50, for the reasons illustrated below.

Figure 1:
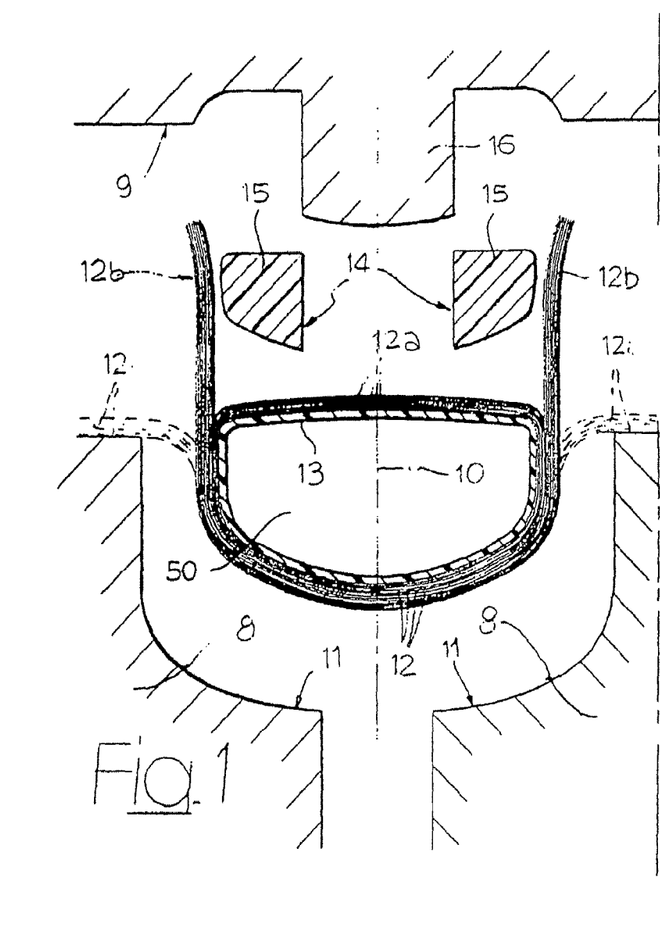
FIGS. 1, 2 and 3 illustrate three different phases of a molding method of a bicycle rim according to this invention.
Figure 2:
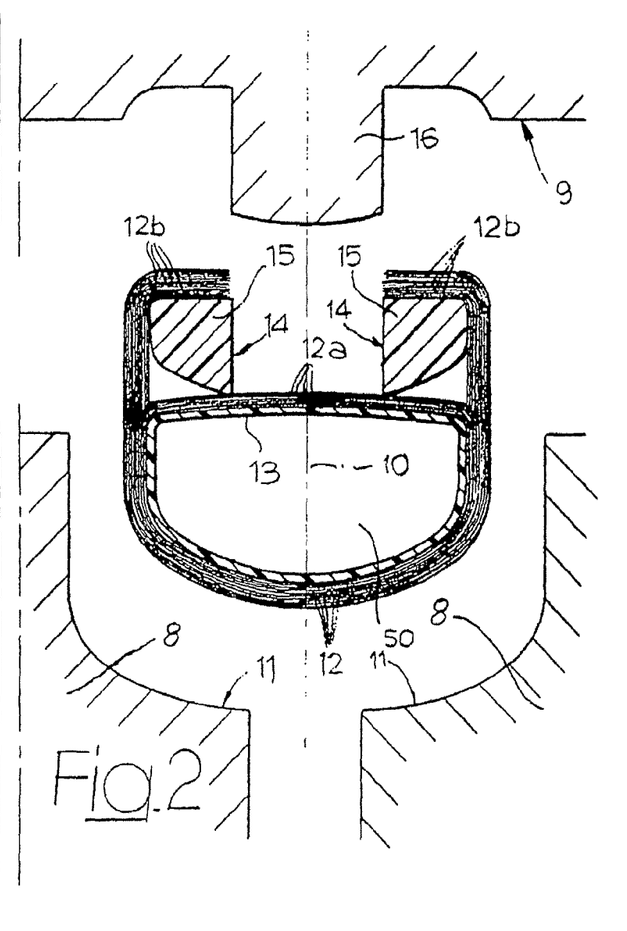
Figure 3:
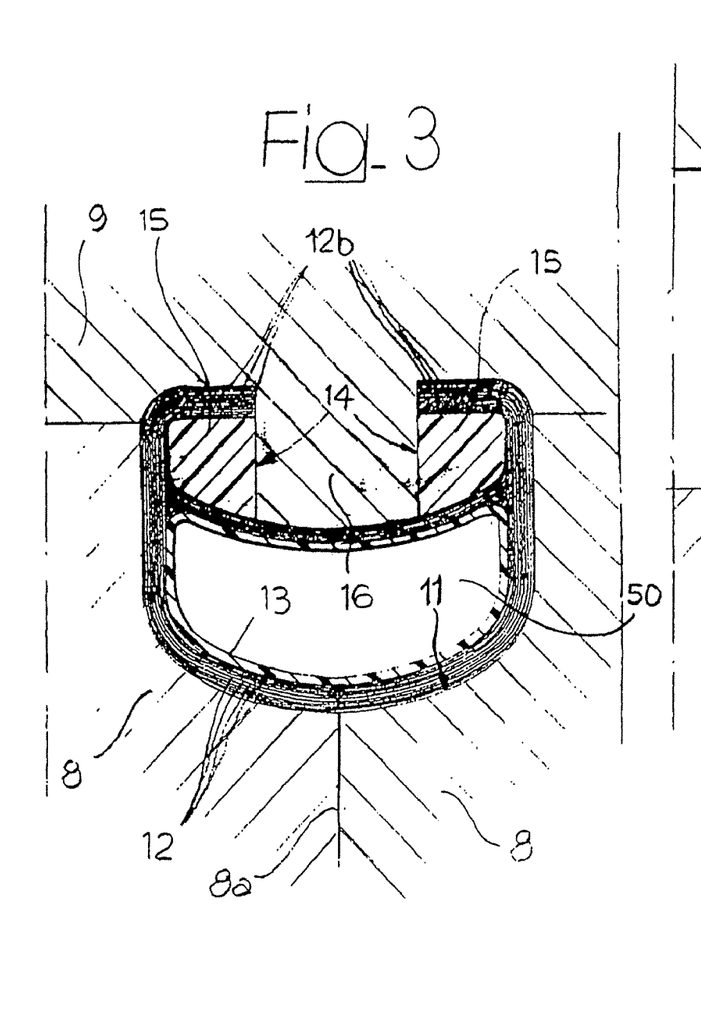

FIGS. 1-3 show three subsequent phases of the method according to this invention, with the use of a first type of mold.

In this case, the mold used for molding the rim comprises two inner elements 8 and an outer element 9. The inner elements 8 are circumferential elements which overlap on a plane 8a. They define a circumferential surface 11 destined to delimit, as shown in FIG. 3, the outer surface of the inner peripheral wall and the two sides of the rim. In order to form the rim, a number of layers 12 of the structural fiber based fabric, for example carbon fiber fabric, incorporated in a plastic material matrix, are arranged on the surface 11, but the structural fibers can be selected among carbon fibers, glass fibers, aramidic fibers, boron fibers, ceramic fibers or any combinations thereof. The arranged layers 12 are destined to assume the conformation shown in FIG. 1. Firstly, the layers 12 are arranged on the surface 11 so to present sections 12 radially extending outwards from the mold elements 8, which are arranged in the position illustrated with the dotted line. An inflatable bag made of plastic material 13 is then arranged on the layers. The bag is equipped with an inflating valve (not shown), which communicates externally to the mold by means of a passage. The purpose of the inflatable bag 13 is to press the layers of fabric 12 against the walls of the mold during the molding process while the mold is closed. Again with reference to FIG. 1, after positioning the plastic material bag 13, a certain number 12a of the projecting sections of the layers of fabric 12 are partially folded back, over the bag 13 and another number 12b is left free to form edges destined to make the circumferential tire anchoring wings 6. Naturally, additional layers C can be applied on the layers 12 positioned over the bag 13, to achieve any required thickness of the external peripheral wall 2 of the rim, and/or of wings 6. Further, additional layers D can also be applied to fill the side regions of the outer wall of the rim.

Figure 7:
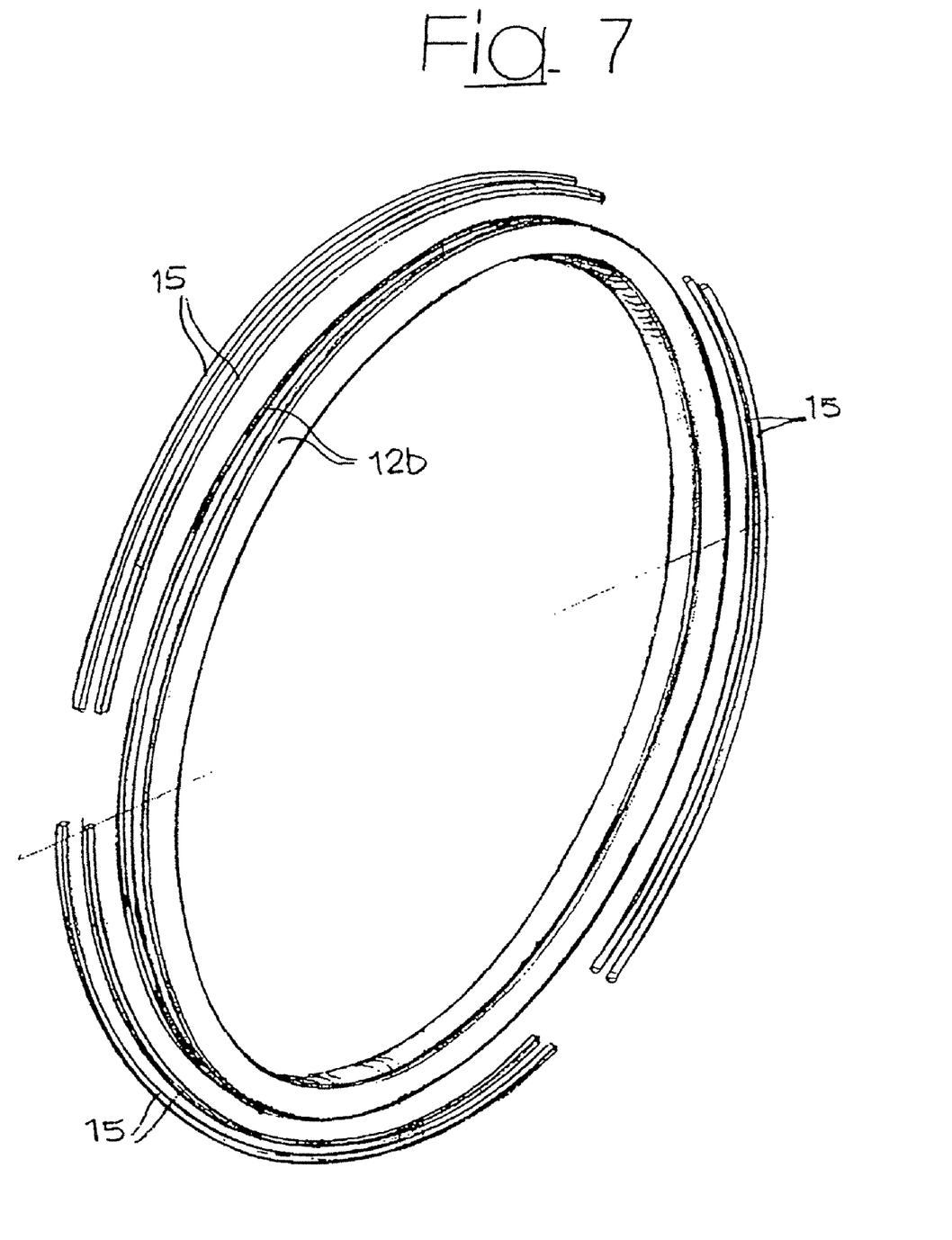
FIG. 7 illustrates a perspective exploded view of a phase of the method.

Again with reference to FIG. 1 and also to FIG. 7, two cores 14, each made of a ring which may be split into several sections (for example into three sections) 15, to facilitate the subsequent extraction of the cores 14 from the mold, are arranged over the layers 12 destined to form the outer peripheral wall 2 of the rim. The two rings 15 are arranged over the layers 12, destined to form the wall 2, in a reciprocally distanced position, so to allow folding one of the edges 12b on it in order to make the tire anchoring wings 6 (see FIG. 2). In the form of embodiment shown in FIGS. 1-3, the space between the two rings 14 is filled by a circumferential ribbing 16 of the outer element 9 of the mold, as shown in FIGS. 2, 3 (the latter figure shows the mold in the closed condition with the bag inflated).

As extensively described above, the material forming the cores 14 is a material presenting a relatively high thermal dilation coefficient, such as PTFE, for example. The mold is thus closed with the layers 12 arranged inside, placed in an oven and subjected to a heating and cooling cycle so to cause the reticulation of the plastic material matrix in which the carbon fiber fabrics are incorporated, on one hand, and the thermal dilation of the cores 14, on the other hand, to press the layers of fabric 12b against the walls of the mold. The pressure required to make the outer and inner peripheral walls and the sides of the rim is ensured by letting prepressurized air into the inflatable bag 13. The temperature to which the mold must be taken in order to complete the process is preferably comprised in the range from 80° C. to 200° C. The mold is preferably maintained at a temperature in this range for a time comprised in the range from 10 minutes to three hours, preferably from 30 minutes to three hours.

Figure 11:
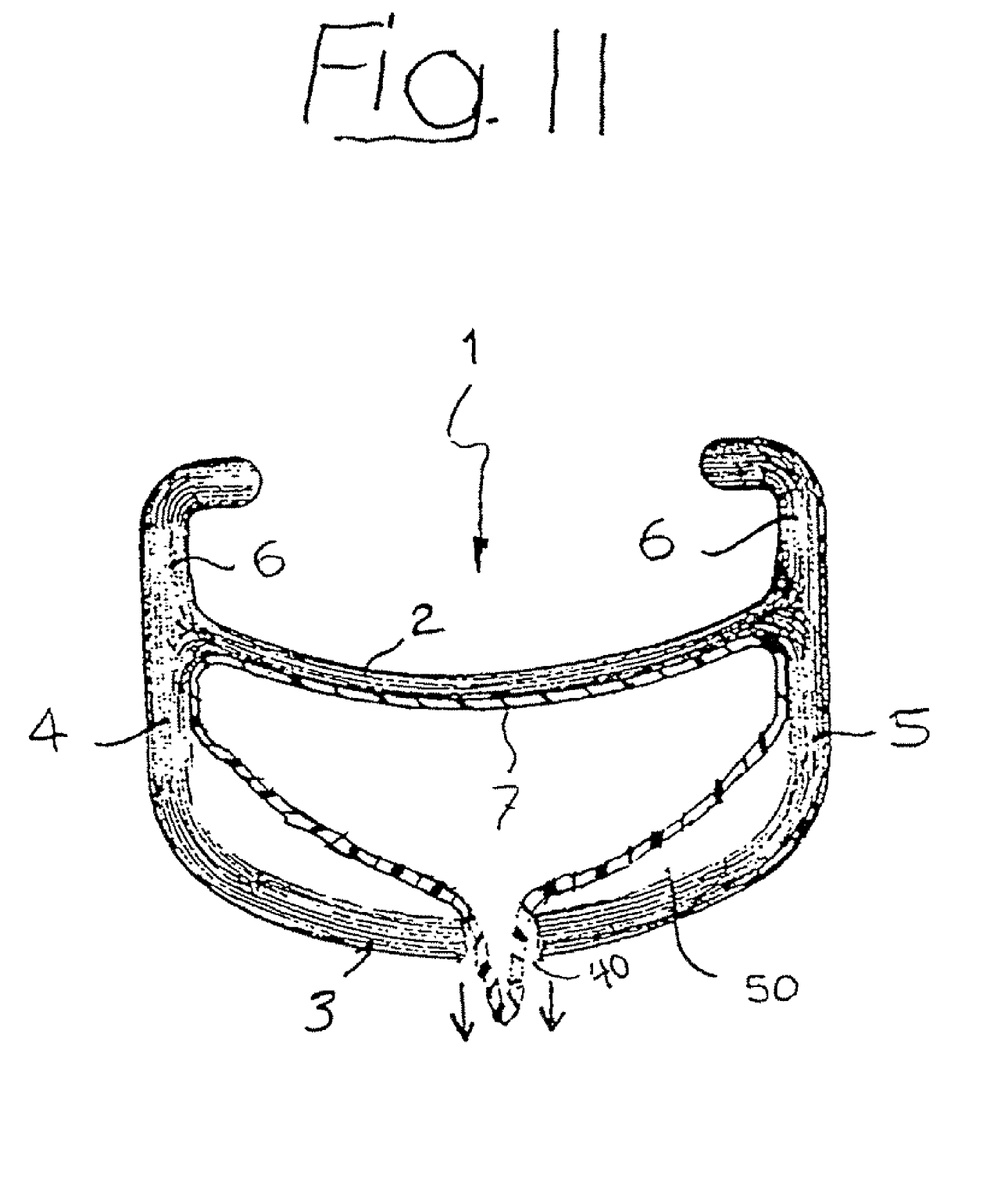
FIG. 11 shows the removal of the inflatable bag.
Figure 12:
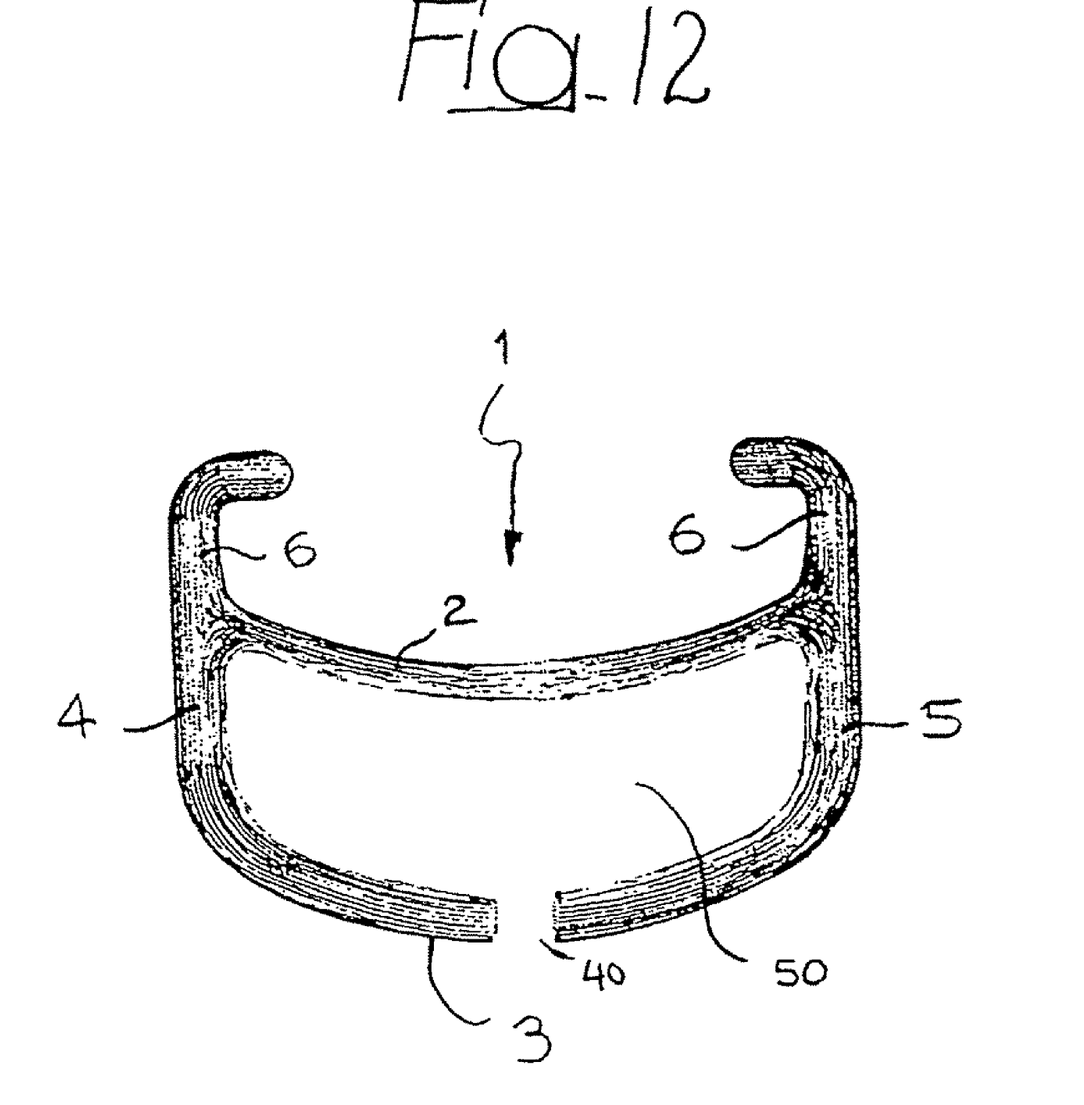
FIG. 12 shows the rim of the present invention with the inflatable bag removed.
Figure 13:
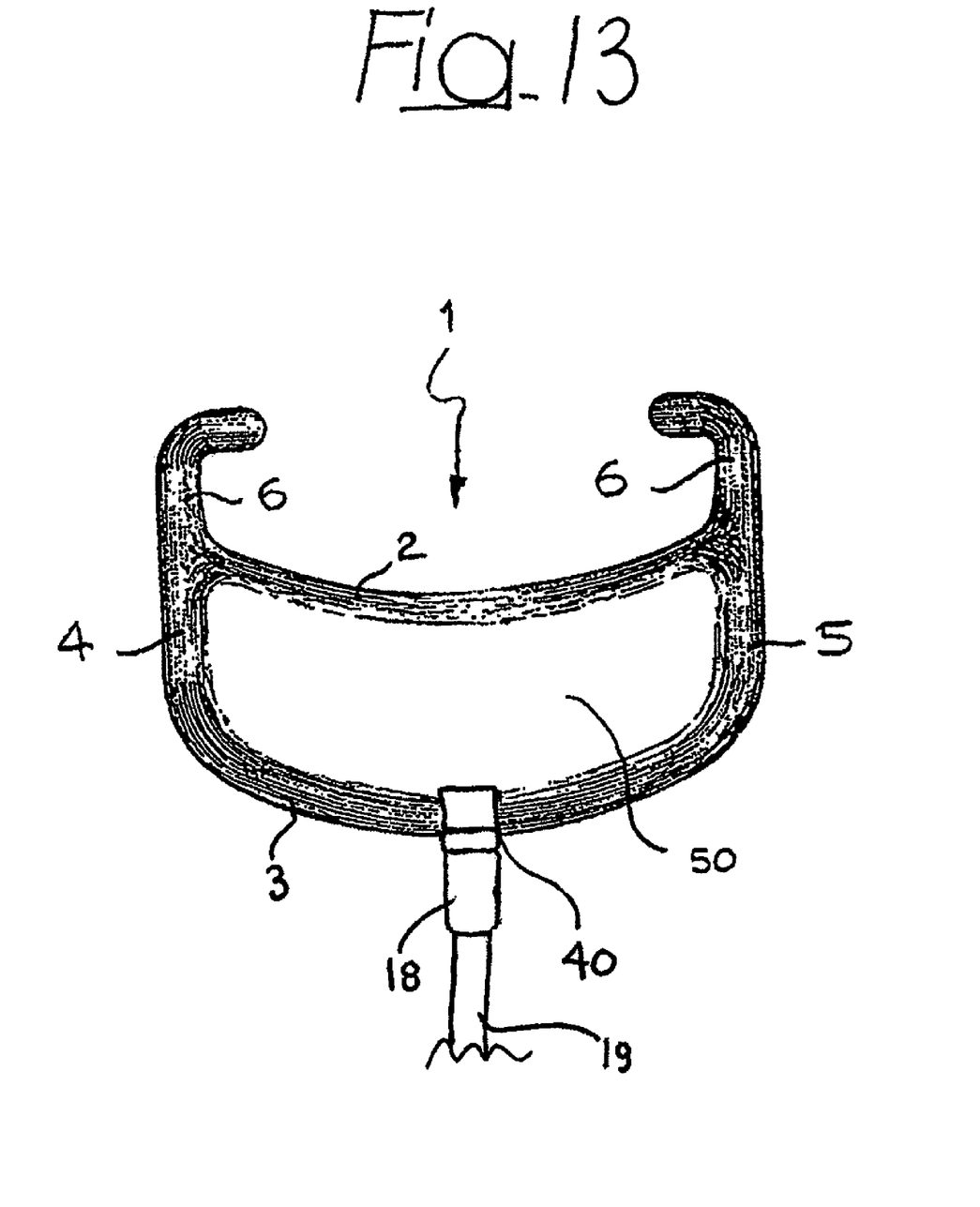
FIG. 13 shows the rim of the present invention with the inflatable bag removed, and having a hole formed therein that houses a nipple that attaches a spoke to the rim.

After the molding process, a cooling phase follows, then the mold is opened and the cores 14 are removed. Holes 40 are then formed in the peripheral walls 2, 3 (see FIG. 12) of the rim. Holes 40 can be used to seat spoke nipples 18 that are used to tension and fasten spokes 19 to the rim 1 when building a wheel, as shown in FIG. 13. The inflatable bag 7 can also be removed from the closed circumferential cavity 50 via these holes (see FIG. 11). The removal of inflatable bag 7 is desirable since its removal reduces the overall weight of the rim.

Figure 8:
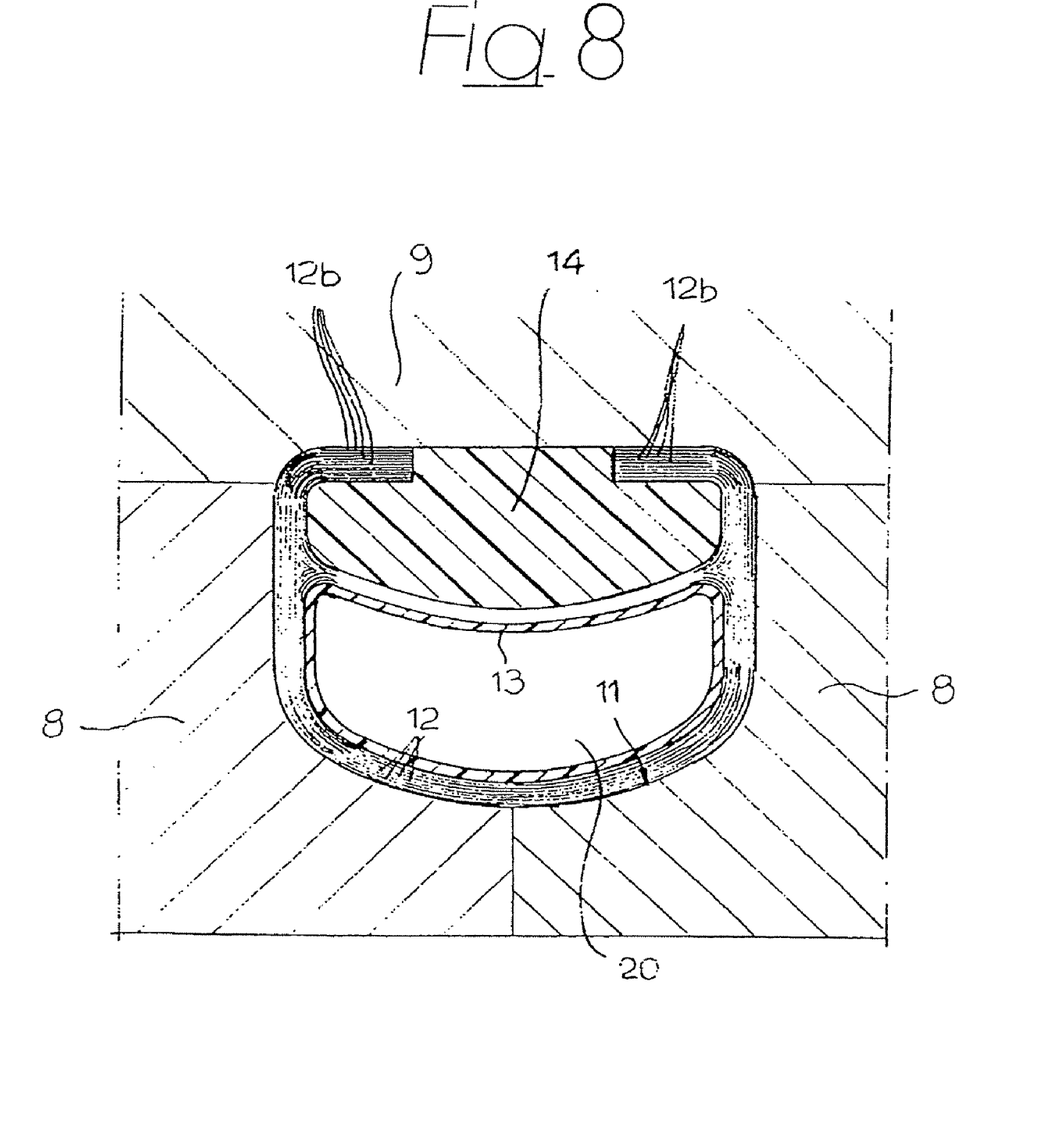
FIG. 8 is a variant of FIG. 5, FIGS. 9, 10 show two further variants.
Figure 9:
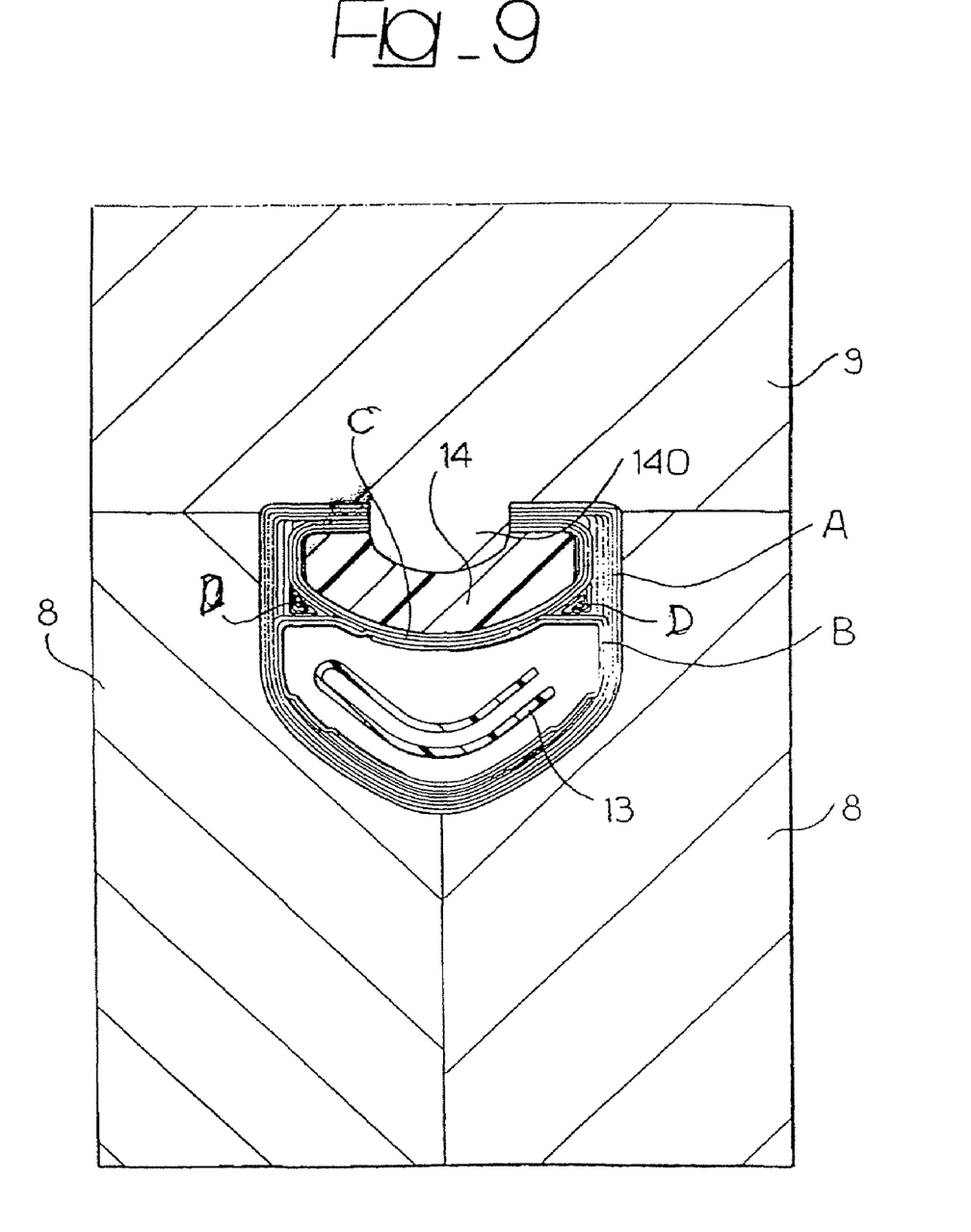

It is important to note that any number, conformation and arrangement of cores used for molding the wings 6 can be used, also entirely different from the cores illustrated in the drawings provided as non-limiting examples. The case of a single core made of deformable material may also be envisaged to allow extraction from the mold (FIG. 8). FIG. 9 shows a further variant in which a single core 14 is provided in form of a silicone sheath made in a single continuous piece or in sectors. This sheath is deformable and kept in a centered position by a projection 140 of the outer mold. At the end of the process the silicone sheath is extracted with the aid of pliers According to an additional important characteristic of the invention, the edges 12b of the layers destined to form the wings 6 are arranged to form a length exceeding the required dimensions. Consequently, at the end of the molding process, the parts are mechanically machined to reduce the wings 6 to the required length and/or shape. The method also has the advantage of eliminating any surface defects which may be present on the ends of the edges 12b at the end of the molding process in the mold. This characteristic can be used regardless of the molding process used, and is consequently an invention in its own right.

Figure 4:
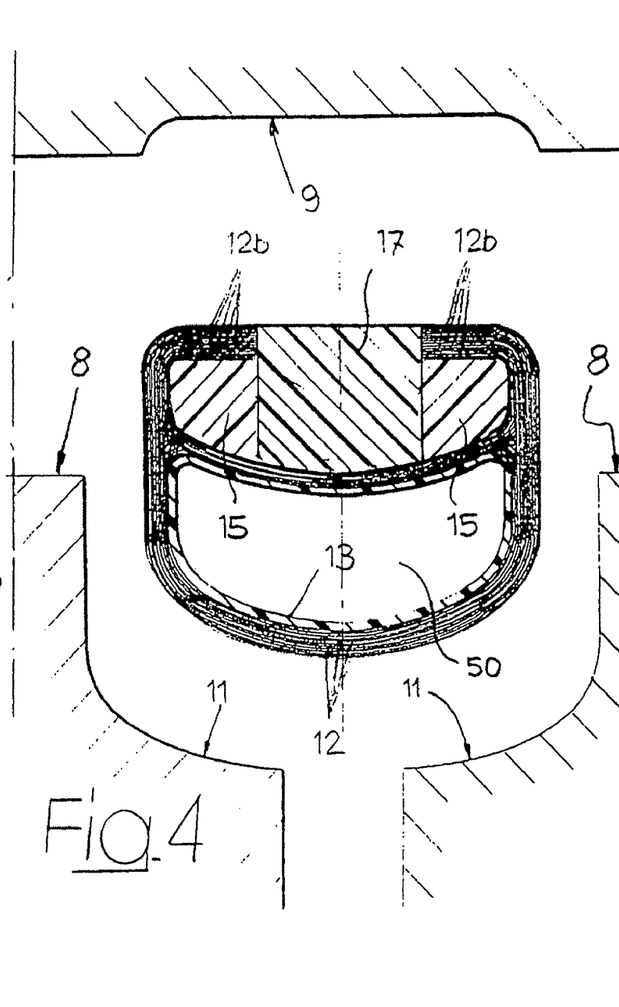
FIGS. 4, 5 illustrate two different phases of the method of this invention, with the use of a modified mold with respect to the one shown in FIGS. 1-3.
Figure 5:
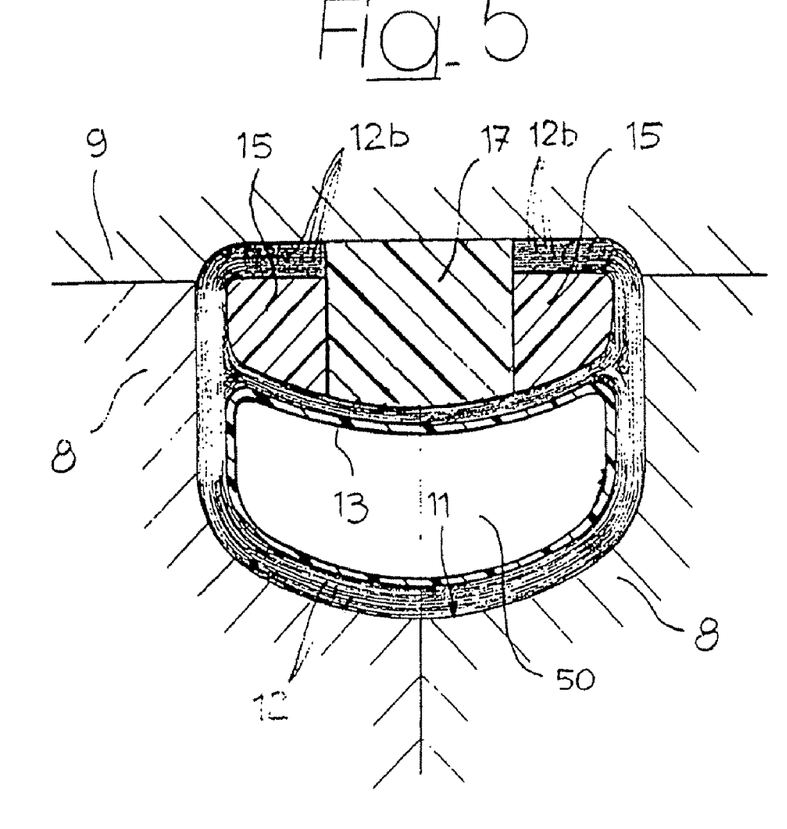

FIGS. 4, 5 illustrate a second type of mold in the open condition and in the closed condition. In this case, the space comprised between the two ring-shaped cores 14 is occupied by a third ring-shaped core 17, also made of high thermal dilating material, for example PTFE.

Figure 10:
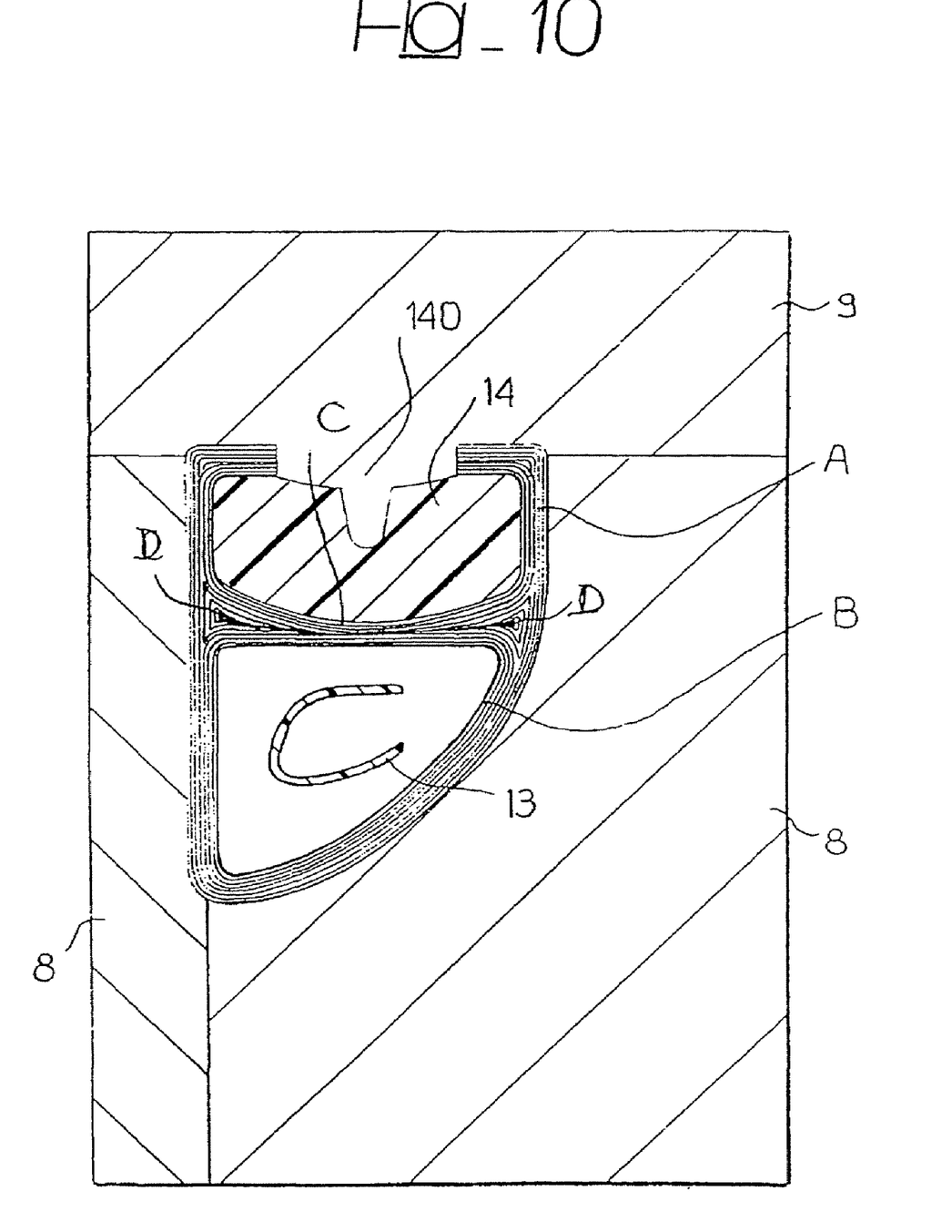

Finally, FIG. 10 shows the case of a rim with asymmetrical cross-section obtained according to the principles of the present invention. In this case the layers of fiber fabric material include first layers A extending so as to contribute to define the inner wall, the side walls and the two wings of the rim, second layers B arranged so as to contribute to define the inner, side and outer walls of the rim, third layers C arranged to define the outer wall and the two wings of the rim, and fourth layers D wound to fill the side regions of the outer wall of the rim from which the wings depart.

Naturally, numerous changes can be implemented to the construction and forms of embodiment of the invention herein envisaged, all comprised within the context of the concept characterizing this invention, as defined by the following claims.

What is claimed is:

1. A method of producing a bicycle wheel rim, comprising:
   a. providing a mold having an inner element, an outer element, and a core element, and defining a molding cavity shaped as the rim having an inner peripheral wall, an outer peripheral wall, two lateral walls joining the inner peripheral wall and the outer peripheral wall, and circumferential tire anchoring wings;
   b. arranging a predetermined number of layers of structural fiber fabric incorporated in a thermosetting plastic material over the inner element;
   c. arranging an inflatable bag over the selected number of layers;
   d. designating a portion of the predetermined number of layers of structural fibers as an inner portion and another portion of the predetermined number of layers of structural fibers as an outer portion and folding the inner portion of the predetermined number of layers over the inflatable bag;
   e. arranging the core element over the inner portion of the selected number of layers;
   f. folding the outer portion of the selected number of layers over the core element;
   g. placing the outer element over the folded outer portion of the predetermined number of layers;
   h. heating the mold to a curing temperature of the thermosetting plastic material to form a rigid composite rim structure while inflating the inflatable bag;
   i. removing the rim structure from the mold;
   j. forming a plurality of spoke attachment holes in the inner peripheral wall; and
   k. removing the inflatable bag through a spoke attachment hole while preserving the respective spoke attachment hole.

2. The method of claim 1, wherein said core element applies pressure to said outer portion of the predetermined number of layers.

3. The method of claim 1, further comprising applying pressure while heating the mold.

4. The method of claim 1, further comprising cooling the mold before removing the rim structure from the mold.

5. The method of claim 1, wherein said core is made of a material with a thermal dilation coefficient exceeding $5\times10^{-5}$ mm/° C., and heating the mold comprises increasing a mold temperature to a value sufficient to cause a material of said core to dilate so to press the layers of fabric forming the tire anchoring wings against the wall of the mold.

6. The method of claim 5, wherein the material forming the core has a thermal dilation coefficient exceeding $9\times10^{-5}$ mm/° C.

7. The method of claim 6, wherein the material forming the core is either PTFE, or PCTFE, or PVDF, or PE-HD.

8. The method of claim 6, wherein the material forming the core is PTFE.

9. The method of claim 1, wherein said structural fiber fabric comprises carbon fibers.

10. The method of claim 1, wherein said thermosetting plastic material is a thermosetting plastic material matrix.

11. The method of claim 1, wherein said curing temperature is comprised in the range from 80 to 200° C.

12. The method of claim 11, wherein said curing temperature is maintained for 10 minutes to 3 hours.

13. The method of claim 12, wherein said curing temperature is maintained for 30 minutes to 3 hours.

14. The method of claim 1, wherein the core element comprises two ring-shaped cores, which are arranged so as to be spaced from each other.

15. The method of claim 14, wherein each ring-shaped core is made in a single piece of deformable material.

16. The method of claim 14, wherein each ring-shaped core is split into several sectors.

17. The method of claim 14, wherein the space between said ring-shaped cores is filled by a circumferential rib of the mold.

18. The method of claim 14, wherein a third ring-shaped core is arranged between said two rings.

19. The method of claim 18, wherein said third ring-shaped core is made in a single piece of deformable material.

20. The method of claim 18, wherein said third ring-shaped core is split into several sectors.

21. The method of claim 1, wherein the core is made by a single ring-shaped member of deformable dilating material.

22. The method of claim 21, wherein the core is made of a silicone sheath.

23. The method of claim 22, wherein the silicone sheath is divided in sectors.

24. The method of claim 23, wherein the single ring-shaped core has an outwardly facing recess for engagement of a centering projection of the mold.

25. The method of claim 24, wherein the centering projection is provided on an outer portion of the mold.

26. The method of claim 1 wherein the mold comprises two inner elements arranged side by side, on which the inner portion of the selected number of layers are deposited, to form the inner peripheral wall and two lateral walls of the rim, and the outer element presses on said outer portion of said selected number of layers to form the tire anchoring wings.

27. The method of claim 1, wherein said structural fiber fabric comprises structural fibers are selected among: carbon fibers, glass fibers, aramidic fibers, boron fibers, ceramic fibers, or any combinations thereof.

28. The method of claim 1, wherein said tire anchoring wings are are initially formed with a longer length than required, the method further comprising reducing said tire anchoring wings to the required length or shape by a machining operation.

29. The method of claim 1, further comprising applying a first set of additional layers to increase the thickness of an outer wall or of the wings of the rim.

30. The method of claim 29, further comprising applying a second set of additional layers to fill side regions of the outer wall of the rim from which said tire anchoring wings depart.

31. The method of claim 1, wherein said mold defines a rim shape with a symmetrical cross-section.

32. The method of claim 1, wherein said mold defines a rim shave with an asymmetrical cross-section.

33. The method of claim 1, wherein the spoke attachment holes seat spoke nipples that tension and fasten the spokes to the rim.

* * * * *